United States Patent
Boyle et al.

(10) Patent No.: US 10,702,829 B2
(45) Date of Patent: Jul. 7, 2020

(54) OPEN BOTTOM MULTIPLE CHANNEL GAS DELIVERY DEVICE FOR IMMERSED MEMBRANES

(71) Applicant: BL Technologies, Inc., Minnetonka, MN (US)

(72) Inventors: Gavin James Boyle, Oakville (CA); Zamir Alam, Oakville (CA); Reid Bayly, Oakville (CA)

(73) Assignee: BL Technologies, Inc., Minnetonka, MN (US)

( * ) Notice: Subject to any disclaimer, the term of this patent is extended or adjusted under 35 U.S.C. 154(b) by 0 days.

(21) Appl. No.: 14/442,411

(22) PCT Filed: Nov. 14, 2012

(86) PCT No.: PCT/US2012/064915
§ 371 (c)(1),
(2) Date: May 13, 2015

(87) PCT Pub. No.: WO2014/077803
PCT Pub. Date: May 22, 2014

(65) Prior Publication Data
US 2015/0336057 A1   Nov. 26, 2015

(51) Int. Cl.
*B01D 61/20* (2006.01)
*B01D 65/08* (2006.01)
(Continued)

(52) U.S. Cl.
CPC ............ *B01D 61/20* (2013.01); *B01D 65/08* (2013.01); *C02F 3/1273* (2013.01); *C02F 3/208* (2013.01);
(Continued)

(58) Field of Classification Search
CPC ..... B05C 11/06; B05B 1/044; B01D 2315/06; B01D 2321/185; B01D 65/08;
(Continued)

(56) References Cited

U.S. PATENT DOCUMENTS 2,976,794 A * 3/1961 Allander .................. F24D 5/02
239/566
3,162,702 A   12/1964 Yonner
(Continued)

FOREIGN PATENT DOCUMENTS

EP   0937494 A2   8/1999
EP   1716914 A1   11/2006
(Continued)

OTHER PUBLICATIONS

"The Aeration Product Specialists", Diffuser Express Catalog #110-2012, 2012, pp. 1-31.
(Continued)

*Primary Examiner* — Alex M Valvis

(57) ABSTRACT

A gas delivery device includes a manifold and a plurality of channels. The manifold is adapted to be connected to a source of a pressurized gas. Each of the plurality of channels is in fluid communication with the manifold through a distinct associated port. Each of the plurality of channels has a generally open bottom.

17 Claims, 5 Drawing Sheets

(51) Int. Cl.
*C02F 3/20* (2006.01)
*C02F 3/12* (2006.01)
*C02F 1/44* (2006.01)

(52) U.S. Cl.
CPC .... *B01D 2313/26* (2013.01); *B01D 2321/185* (2013.01); *C02F 1/444* (2013.01); *C02F 2303/16* (2013.01); *Y02W 10/15* (2015.05)

(58) Field of Classification Search
CPC ........ B01D 65/18; B01D 65/02; B01D 61/18; B01D 61/20; C02F 1/444; C02F 3/208; C02F 3/1273
USPC ........... 239/556, 597; 261/119.1, 121.1, 124, 261/123; 210/220, 221.1, 221.2, 321.69, 210/636
See application file for complete search history.

(56) References Cited

U.S. PATENT DOCUMENTS

| | | | | |
|---|---|---|---|---|
| 3,216,181 | A * | 11/1965 | Carpenter | F01N 3/04 261/123 |
| 3,424,443 | A | 1/1969 | Thayer | |
| 5,762,833 | A * | 6/1998 | Gross | B01F 7/1635 261/93 |
| 5,766,457 | A | 6/1998 | Spindler | |
| 6,033,562 | A | 3/2000 | Budeit | |
| 6,086,658 | A * | 7/2000 | Gohara | B01B 3/04 262 134/169 C |
| 7,563,322 | B2 * | 7/2009 | Loth | B05C 11/06 118/63 |
| 8,038,882 | B2 | 10/2011 | Hashimoto | |
| 8,814,067 | B2 * | 8/2014 | Freers | F26B 21/004 239/548 |
| 2005/0006308 | A1 | 1/2005 | Cote et al. | |
| 2005/0115900 | A1 | 6/2005 | Cote et al. | |
| 2005/0218074 | A1 | 10/2005 | Pollock | |
| 2006/0260998 | A1 * | 11/2006 | Suzuki | B01D 61/20 210/321.69 |
| 2007/0158453 | A1 * | 7/2007 | Corona | B05B 1/202 239/14.2 |
| 2011/0049047 | A1 * | 3/2011 | Cumin | B01D 61/08 210/636 |
| 2012/0091602 | A1 | 4/2012 | Cumin et al. | |

FOREIGN PATENT DOCUMENTS

| | | |
|---|---|---|
| JP | 2002527229 A | 8/2002 |
| KR | 20050085341 A | 8/2005 |
| KR | 20120083374 A | 7/2012 |
| WO | 0021890 A1 | 4/2000 |
| WO | 2009157779 A1 | 12/2009 |

OTHER PUBLICATIONS

Unofficial English translation of Office Action issued in connection with corresponding CN Application No. 201280077075.9 dated Jan. 21, 2016.

International Search Report dated Jul. 10, 2013 which was issued in connection with PCT Patent Application No. PCT/US2012/064915 which was filed on Nov. 14, 2012.

Korean Patent Application No. KR1020157015723, Office Action dated Apr. 12, 2018—English Translation not Available.

European Patent Application No. EP 12805814.6, Office Action dated Mar. 22, 2016.

European Patent Application No. EP 12805814.6, Office Action dated Oct. 6, 2016.

European Patent Application No. EP 12805814.6, Office Action dated May 19, 2017.

Canadian Patent Application No. CA 2,890,251, Office Action dated Oct. 31, 2017.

* cited by examiner

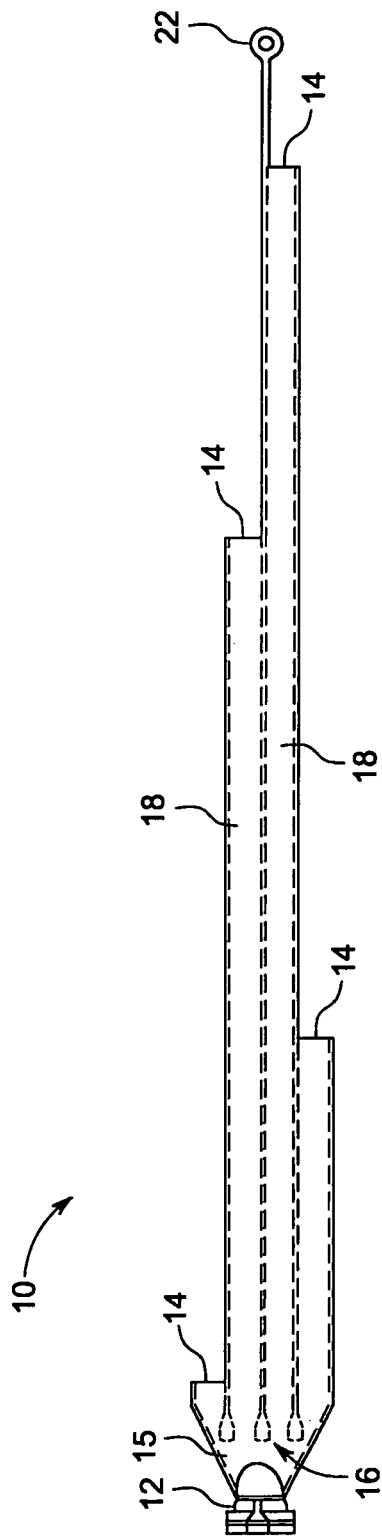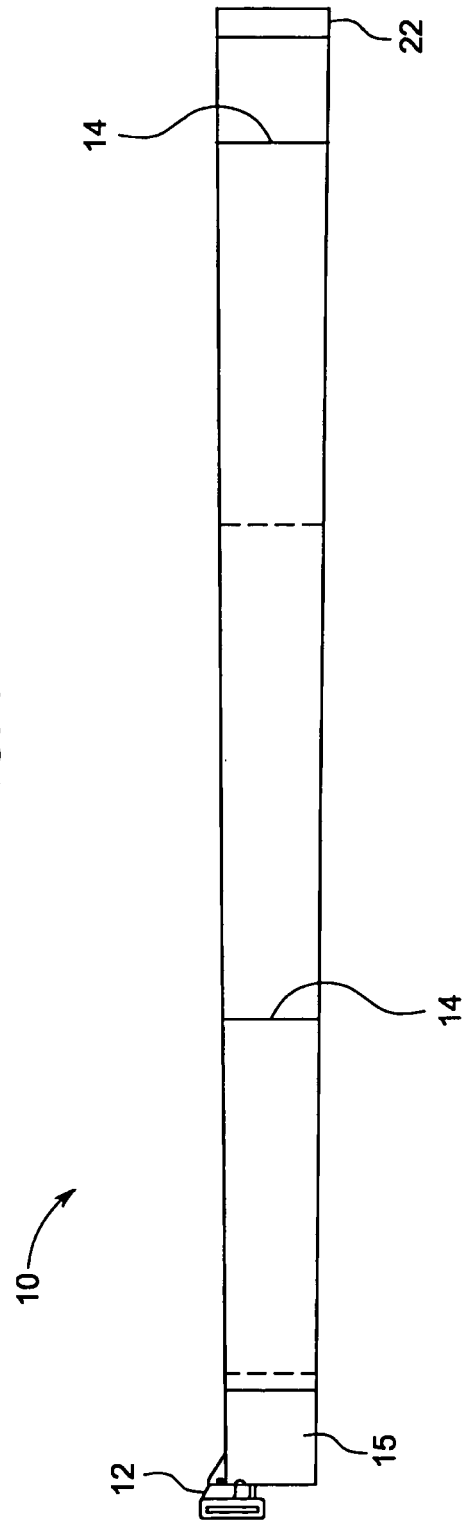

OPEN BOTTOM MULTIPLE CHANNEL GAS DELIVERY DEVICE FOR IMMERSED MEMBRANES

FIELD OF THE INVENTION

Embodiments of this specification relate to a gas delivery device for use, for example, in supplying bubbles to inhibit fouling of an immersed filtering membrane.

BACKGROUND

International Publication Number 2011/028341, Gas Sparger for a Filtering Membrane, describes a gas sparger that produces an intermittent flow of bubbles even if provided with a continuous gas flow. The sparger has a housing to collect a pocket of gas and a conduit to release some of the gas from the pocket when the pocket reaches a sufficient size. A large sparger can be divided into a plurality of units each having a conduit. A gas supply pipe has at least one hole aligned with each unit to deliver air to each of the units. International Publication Number 2011/028341 is incorporated by reference.

SUMMARY

A gas delivery device is described in this specification in which a supply of gas is provided to a manifold with multiple ports. Each port discharges into a conduit that extends horizontally out from the inlet. The area of the ports is less than the area of the conduits. In an embodiment, each conduit has only one outlet for discharging bubbles. In an embodiment, the ports are located closer together than the distance between two adjacent outlets.

In an embodiment, a gas delivery device has a manifold adapted to receive pressurized gas and discharging the gas into a plurality of open bottomed channels. Optionally, each channel may have a single outlet which may be formed by an open end of the channel. The manifold may also have an open bottom. Ports between the inlet manifold and the channels may be in the form of open bottom slots. In another embodiment, a gas delivery device includes a distribution plenum and a plurality of channels. The distribution plenum is adapted to be connected to a source of a pressurized gas and each of the plurality of channels is in fluid communication with the distribution plenum through a distinct associated port. Each of the plurality of channels has an outlet adapted to discharge gas. The ports have a smaller area than the channels and the ports are located close together relative to a spacing between the openings.

In an embodiment, an aeration process includes: bringing a flow of pressurized gas into a tank to near or below the bottom of a membrane module; splitting the flow of pressurized gas into multiple flows of pressurized gas; directing each of the multiple flows of pressurized to a different lateral position; and releasing bubbles from the different lateral positions. In another embodiment, an aeration process includes: providing a gas delivery device with a manifold adapted to be connected to a source of a pressurized gas and a plurality of channels, each in fluid communication with the manifold through a distinct associated port and having a generally open bottom; and providing a flow of pressurized gas to the gas delivery device.

BRIEF DESCRIPTION OF THE FIGURES

FIG. 1 is a top view of a gas delivery device according to an embodiment of the invention;

FIG. 2 is a bottom view of the gas delivery device of FIG. 1;

DETAILED DESCRIPTION

Figure 3:
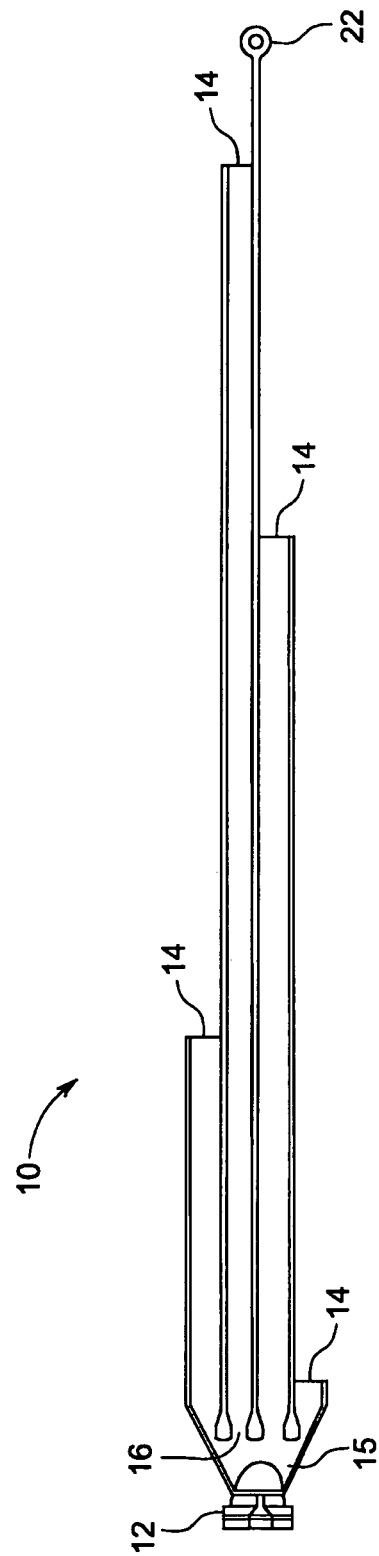
FIG. 3 is a side view of the gas delivery device of FIG. 1.
Figure 4A:
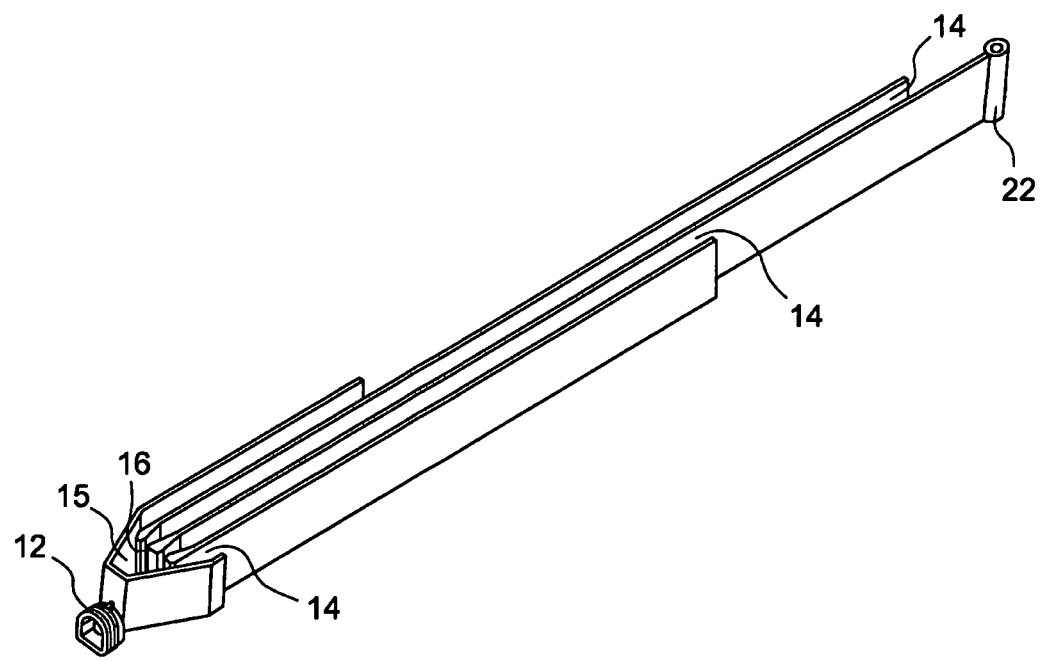
FIG. 4A is an isometric view of the bottom of the gas delivery device of FIG. 1.
Figure 4B:
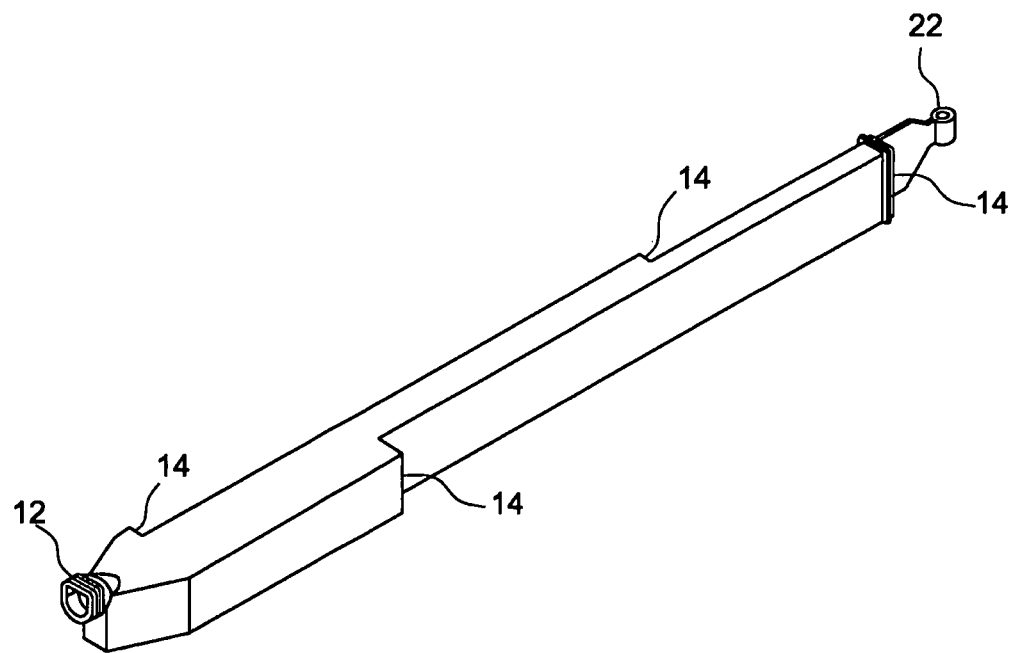
FIG. 4B is an isometric view of the top of the gas delivery device of FIG. 1.

In a gas sparger as described in International Publication Number 2011/028341, a unit of the sparger that receives a larger flow rate of input gas will produce pulses of bubbles at a higher frequency. In order to uniformly clean a membrane cassette, it may be desirable to have each unit operate at near the same frequency. The holes of the gas supply pipe are made small to help equalize the gas flow rate between holes feeding different units of the sparger. However, if the gas supply pipe is installed out of level by as few as 6 mm over a length of about 500 mm, the holes at higher elevation will have a noticeably larger gas flow rate. In addition, solids entering the gas supply pipe during maintenance periods when the gas supply is turned off can dry out or agglomerate when the gas is turned back. Occasionally, a solid particle is formed in the gas supply tube that is large or rigid enough to be lodged into one of the holes and to restrict or block the hole. A partially or completely blocked hole will in turn lead to poor distribution of gas to the membranes and allow solids to accumulate on the membranes. A gas delivery device will be described below that can be used as an alternative to such a gas supply pipe either with or without a further gas sparger.

FIGS. 1 to 4 show different views of a gas delivery device 10. Alternatively, the gas delivery device 10 may be called an aerator or a sparger. In use, the gas delivery device 10 is immersed in a liquid, for example water or activated sludge. Pressurized gas is supplied to an inlet 12 of the gas delivery device and is emitted as bubbles from a plurality of outlets 14. The gas may be air or in some applications another gas, for example biogas, nitrogen, ozone or oxygen may be used. The gas delivery device 10 shown has four outlets 14, but there may alternatively be more or less outlets 14.

The inlet 12 is separated from the outlets 14 by a plurality of ports 16. Each outlet 14 communicates with a port 16 through a channel 18. Part of the gas delivery device 10 from the inlet 12 to the ports 16 functions as a manifold 15, alternatively called a plenum, to distribute the gas entering through the inlet 12 among the channels 18. The inlet 12, ports 16 and outlets 14 are located at generally the same elevation but spaced horizontally. The gas flows generally horizontally in the channels 18.

The area of the ports 16 is less than the area of the channels 18, or less than the area of the smallest of the channels 18 if they have different areas. For example, the channels 14 may have a cross sectional area that is three times or more than the cross sectional area of the ports 16. The ports 16 restrict the flow of gas into the channels 14. The restriction provided by the ports 16 helps to distribute the total airflow more nearly equally among the channels 18.

Decreasing the area of the ports 16 produces a more nearly equal flow in the channels 18 but also increases head loss through the ports 16. The ports 16 may be made all of the same area. The area of the ports 16 may be reduced until the flow is adequately distributed among the channels 18. Optionally, a port 16 opening into a long or narrow channel 18 may be larger than a port 16 opening into a short or wide channel 18 to help equalize the flow among the channels 18. Alternatively, one or more ports 16 may be made larger than other ports 16 to intentionally increase the relative airflow through one or more channels 18. This may be done, for example, to provide more air to the extremities of an immersed membrane cassette to counteract a tendency for water to be lifted through the center of a cassette.

As shown in FIG. 1 and FIG. 2, the ports 16 are located close to each other in the horizontal direction. In this way, if the gas delivery device 10 is mounted a few degrees out of level, there is very little difference in elevation between the ports 16. In particular, the largest horizontal distance between two ports 16 is less than the average horizontal distance between adjacent outlets 14, or less than half of the average horizontal distance between adjacent outlets 14. The largest horizontal distance between the ports 16 is also less than 25%, or less than 10%, of the largest distance from a port 16 to an outlet 14. This helps produce a more nearly equal distribution of the gas among the channels 18 compared to an ordinary aerator in the form of a tube with holes when the gas delivery device 10 is mounted out of level. Because the ports 16 are primarily responsible for equalizing flow between channels 18, the outlets 14 can be made larger, for example as large as the cross sectional area of the channels 18, so that any solids that accumulate in a channel 18 are unlikely to block the outlet 14.

The gas delivery device 10 has its outlets 14 spaced generally in a line. Alternatively, other configurations may be used. For example, channels 18 could extend along a line but in both directions from the inlet 12. In another example, the channels 18 could radiate from the inlet 12 like spokes from a wheel hub.

Optionally, the top of the channels 18 may be pointed slightly upwards. In this way, if the gas delivery device is inadvertently mounted with a slightly downwards slant, then gas will not be trapped in the channels 18 when the supply of gas is off. A slight upwards slant may also help compensate for differences between the lengths of the channels 18.

Figure 7:
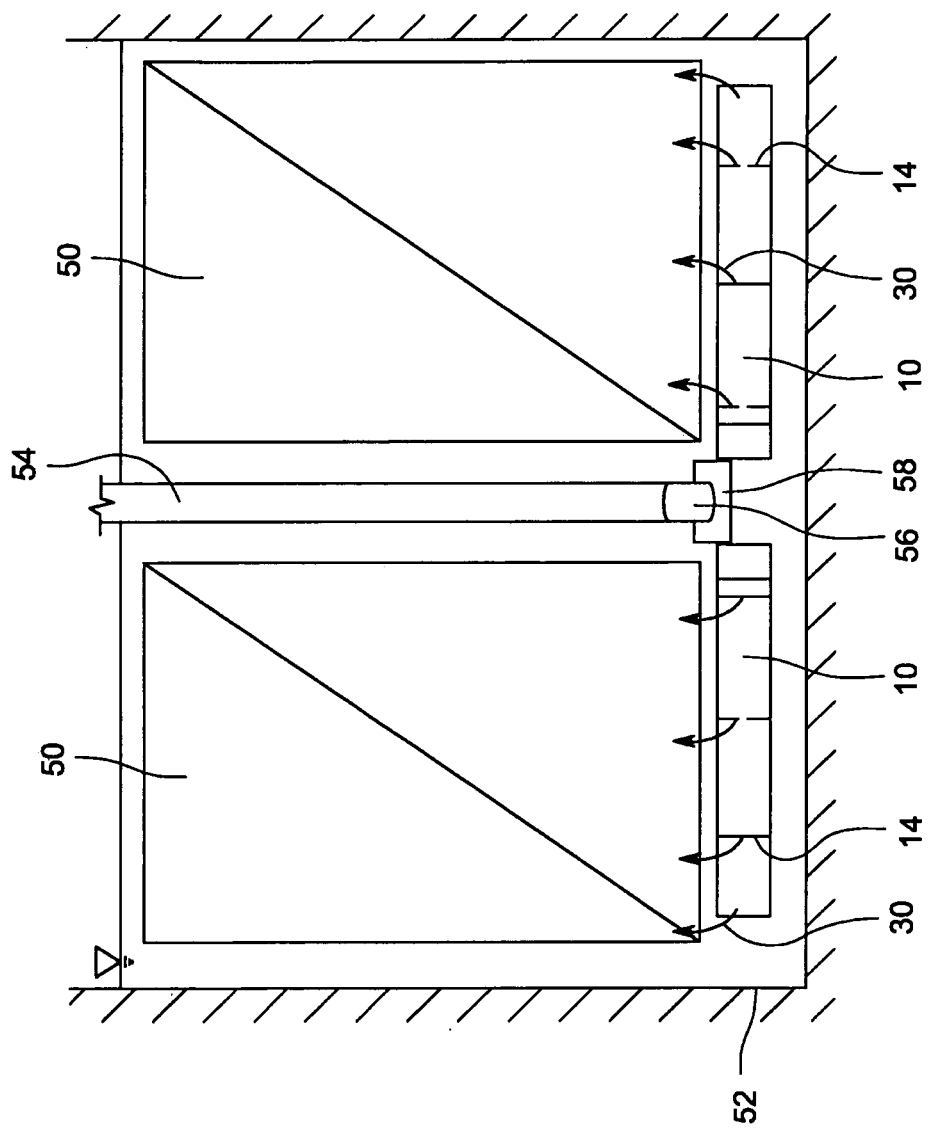
FIG. 7 is a schematic cross section of a tank having a suction driven membrane module and an aeration system immersed in the tank according to an embodiment of the invention.

Referring to FIG. 7, the gas delivery device 10 may be used, for example, to provide bubbles for scouring an immersed membrane module 50. A device with a line of outlets 14 is particular suited for providing bubbles to membrane modules with rectangular elements such as flat sheet modules or ZeeWeed™ hollow fiber elements sold by GE Water & Process Technologies.

The gas delivery device 10 is immersed in a tank 52 containing one or more membrane modules 50. The gas delivery device 10 may be mounted separately in the tank 52 or attached to the membrane modules 50. Gas may be brought down into the tank from a riser pipe 54 and then spread horizontally through as header 56. Saddles 58 attached to the header 56 receive gas from the header and carry the gas to a line of gas deliver devices 10 oriented perpendicularly to the header 56 in a generally horizontal plane. Optionally, a gas delivery device 10 may be connected directly to a header 56 or riser pipe 54. Streams of bubbles 30 are discharged from the outlets 14 at various lateral positions relative to a membrane module 50. The gas flowing to each lateral position bypasses any intermediate lateral positions. The bubbles 30 may be allowed to rise directly to the membranes to clean them or inhibit fouling. Alternatively, a transducer may be placed above the gas delivery device 10 to modify its output before the bubbles reach the membranes. For example, a diffuser may be placed over an outlet to disperse the bubbles over a wider area.

Figure 5:
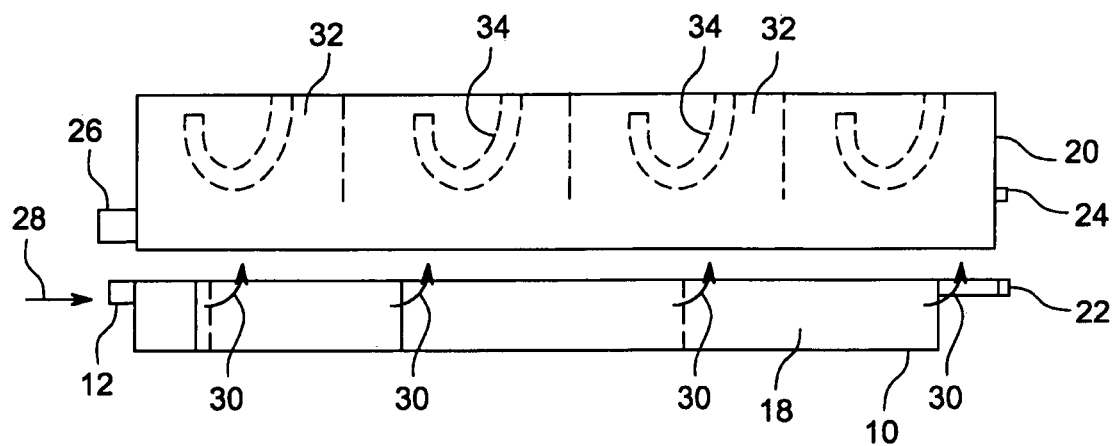
FIG. 5 is a side view of the gas delivery device of FIG. 1 in combination with an intermittent gas sparger.

FIG. 5 illustrates another transducer option in which an intermittent gas sparger 20, for example of the type shown in International Publication Number 2011/028341, is associated with the gas delivery device. Pressurized gas 28 is split in the gas delivery device into four bubble streams 30. Each bubble stream 30 rises into a different cavity 32 of the intermittent air sparger 20. Gas flowing through a conduit 18 to a particular cavity 32 bypasses any intervening cavities 32.

Each cavity 32 has a discharge conduit 34, in the form a J-shaped tube in the example of FIG. 5, which acts like an inverted siphon to discharge intermittent pulses of air from the cavity 32. Bubbles emitted from the gas delivery device 10 first collect in the cavity 32 forming a pocket of gas in the top of the cavity 32. No gas is emitted from the cavity 32 until the pocket of gas expands to reach the low point of the discharge conduit 34. At that time, the pocket of gas empties out of the cavity 32 through the conduit 34 and the process repeats. In this way, a continuous stream of bubbles 30 from the gas delivery device 10 is converted into an intermittent flow of bubbles from the intermittent gas sparger 20.

In FIG. 5, the gas delivery device 10 is shown mounted separately and below the intermittent gas sparger 20. Alternatively, the gas delivery device 10 may be mounted to the intermittent gas sparger 20. In the example shown, the inlet 12 may be fitted into a receptacle 26 of the intermittent gas sparger 20. A fastener (not shown) is then placed through an eyelet 22 on the gas delivery device 10 and into an abutment 24 on the intermittent gas sparger 20. This results in the gas delivery device 10 being located partially within the intermittent gas sparger 20. However, the outlets 14 are below the conduits 34 and still discharge into water below the lower limit of the pockets of gas in the cavities 32.

Figure 6:
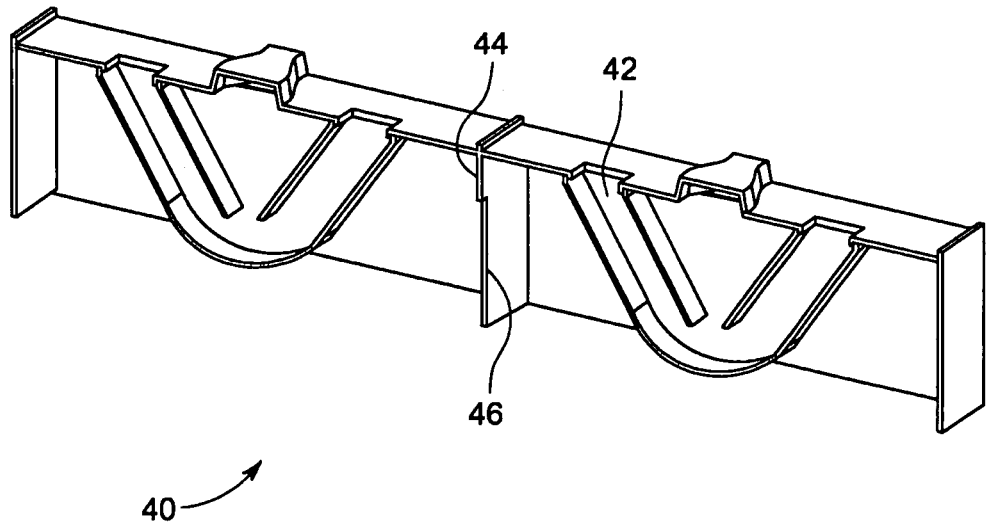
FIG. 6 is an isometric cross sectional view of the bottom of an alternative intermittent gas sparger according to an embodiment of the invention.

FIG. 6 is an isometric cross sectional view of the bottom of an alternative intermittent sparger 40. In this example, multi-port conduits 42 provide two or more outlet paths extending upwards from the low point of each multi-port conduits 42. A divider 44 between adjacent multi-port conduits 42 has a slot 46 extending from the bottom of the divider 44 to above the low point of the multi-port conduits 42. Each cavity with a multi-port conduit 42 replaces two cavities with a single outlet conduit and so avoids a need to balance the supply of gas between the two replaced cavities. The slot 46 in the divider 44 helps equalize the air supply to the cavities. Gas may flow in either direction through the slot 46 but the net flow will be from a cavity that receives a larger gas flow to a cavity that receives a lower air flow.

The gas delivery device 10 is, in a particular embodiment, an open-bottomed structure. For example, the channels 18 are formed by side walls and a top. The channels 18 are open at the bottom and, in a particular embodiment, at their ends. The outlets 14 may be defined by the open end of the channels 18. The manifold 15 between the inlet 12 and the ports 16 is, in a particular embodiment, also open at the bottom. In a particular embodiment, the ports 16 are slots also open at the bottom of the gas delivery device 10. In this way, solids caught anywhere in the gas delivery device 10 beyond the inlet 12 can fall or be expelled downwards out of the gas delivery device 10. Having such a short and simple pathway for solids to leave helps prevent fouling in the gas delivery device 10. In the event that solids somehow still accumulate in the gas delivery device, the open-bottomed structure makes it easy to locate and remove the solids, for example by spraying water into the bottom of the gas delivery device 10.

The open-bottomed construction of the gas delivery device 10 also helps accommodate a range of input gas flow rates. At low flow rates, water enters into the gas delivery device 10 and reduces the size of the ports 16. At higher gas flow rates, less water enters into the gas delivery device 10 and the ports 16 and channels 18 increase in size. An aeration process comprising the steps of, a) providing a gas delivery device according to an embodiment of the invention; and b) providing a flow of pressurized gas to the gas delivery device. In an embodiment of the invention, the flow of pressurized gas is varied within a range of input gas flow rates.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas delivery device comprising:
   a manifold adapted to be connected to a source of a pressurized gas; and
   a plurality of channels, each of the plurality of channels having a first end, a second end and a single outlet formed by the second end of the channel being open, the first end being in fluid communication with the manifold through a distinct associated port, each of the plurality of channels having an open bottom between the first end and the second end,
   wherein the plurality of channels have different lengths relative to each other,
   wherein the plurality of channels are parallel to each other, and wherein each of the plurality of channels extends in the same direction from the first end of the channel to the second end of the channel.

2. The gas delivery device of claim 1 wherein the outlets of the plurality of channels are spaced apart from each other horizontally.

3. The gas delivery device of claim 1, wherein each of the channels has a cross sectional area and each of the ports has an area less than the cross sectional area of the channel that the port is associated with.

4. The gas delivery device of claim 1, wherein the ports are configured as open-bottomed slots.

5. The gas delivery device of claim 1, wherein the manifold is open-bottomed.

6. The gas delivery device of claim 1, in combination with an immersed membrane module.

7. The gas delivery device of claim 1, in combination with a transducer adapted to convert continuous streams of bubbles released from the outlets into intermittent flows of bubbles.

8. The gas delivery device of claim 1 wherein each outlet is as large as a cross sectional area of the outlet's associated channel at the end of the channel.

9. The gas delivery device of claim 1 wherein the plurality of channels are formed by a top and a plurality of side walls extending downwards from the top.

10. The gas delivery device of claim 9 wherein adjacent channels share a common side wall.

11. A gas delivery device comprising:
    a distribution manifold adapted to be connected to a source of a pressurized gas; and
    a plurality of channels, each of the plurality of channels being in fluid communication with the distribution manifold through a distinct associated port, each of the plurality of channels having an outlet at the end of the channel adapted to discharge gas,
    wherein the ports have a smaller area than the channels and the ports are located close together relative to a spacing between the outlets
    wherein the device has four or more channels, each of the channels has a different length, the channels are parallel to each other, and a largest horizontal distance between two of the ports is less than 10% of a largest distance from one of the ports to one of the outlets, and wherein each of the plurality of channels extends in the same direction from the port associated with the channel to the outlet of the channel.

12. The gas delivery device of claim 11, associated with a transducer having multiple compartments, wherein each compartment is associated with one of the channels.

13. The gas delivery device of claim 12, wherein each of the compartments has an inverted siphon.

14. The gas sparger of claim 11, wherein each of the plurality of channels is open bottomed.

15. The gas sparger of claim 14, wherein the manifold and the ports are open-bottomed.

16. An aeration process comprising:
    providing a gas delivery device according to claim 1; and
    providing a flow of pressurized gas to the gas delivery device.

17. The process of claim 16 wherein the flow of pressurized gas is varied within a range of input gas flows.

* * * * *